UNITED STATES PATENT OFFICE.

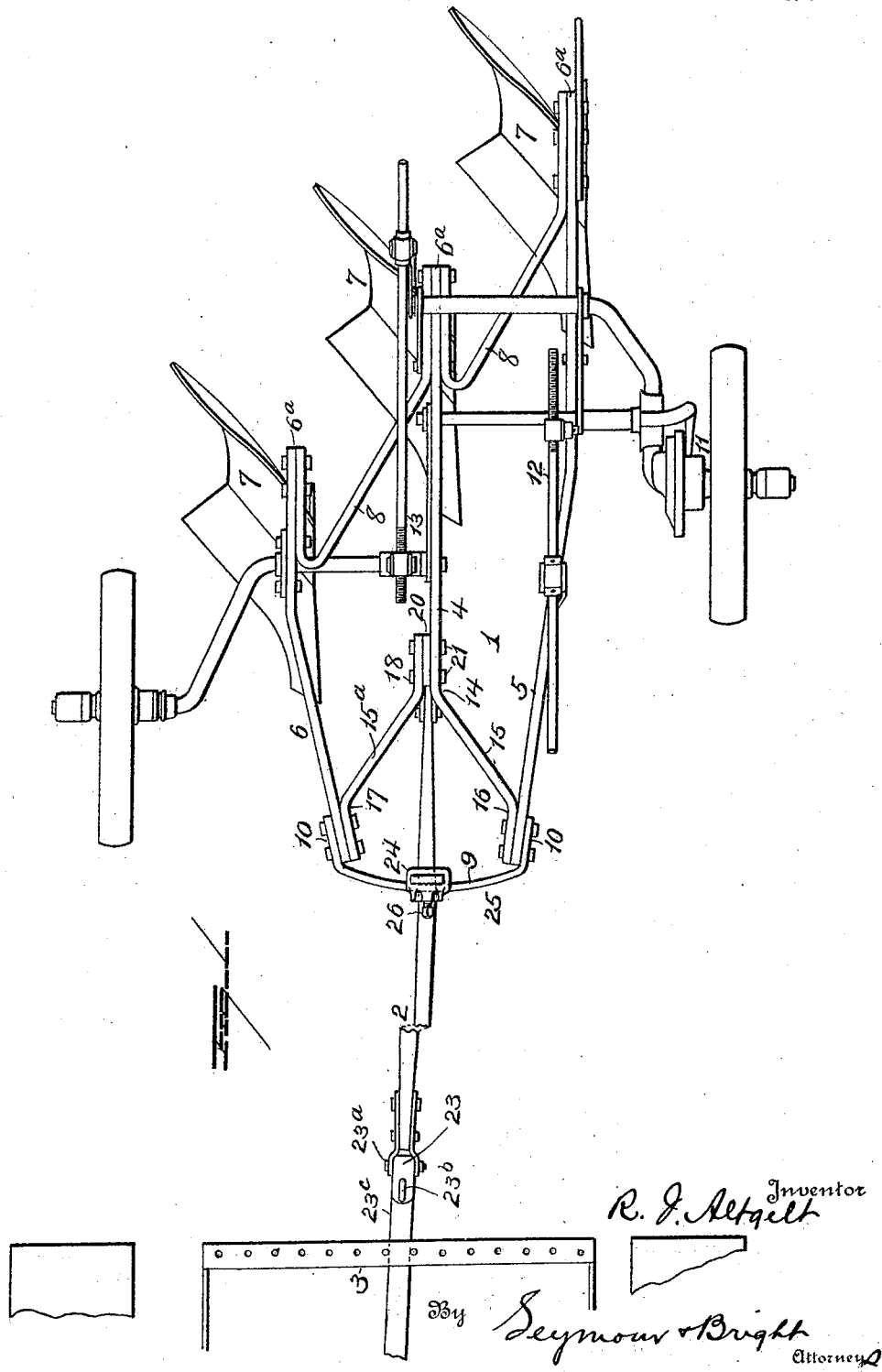

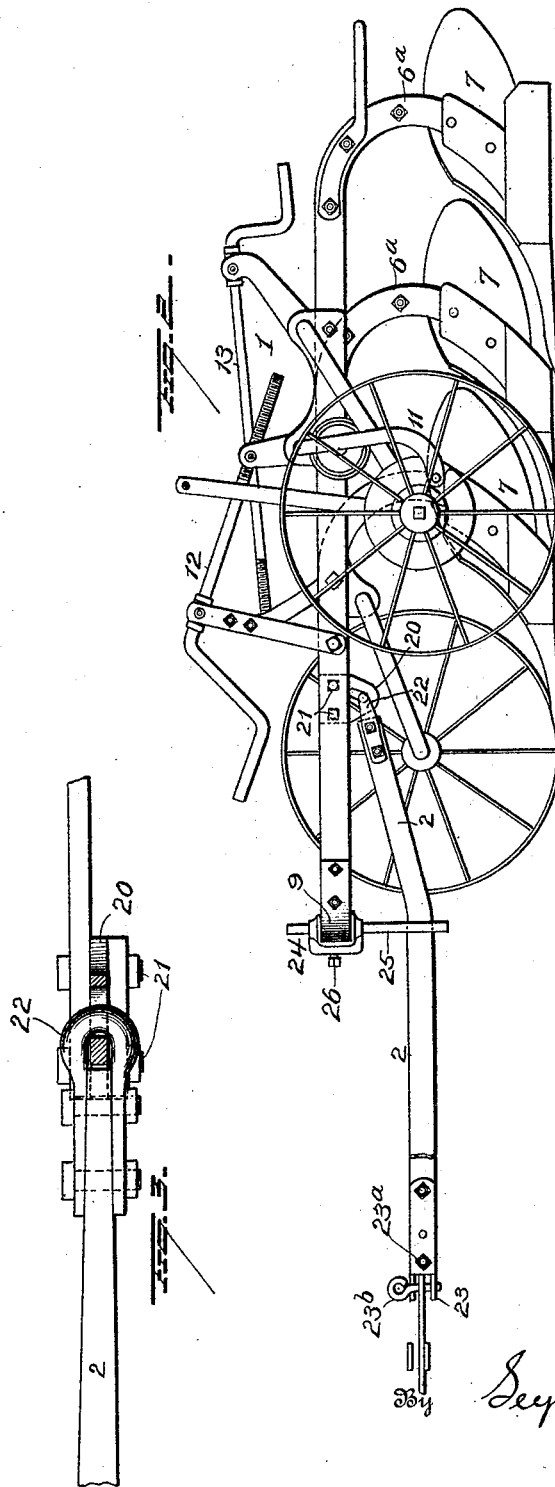

RUDOLPH J. ALTGELT, OF SOUTH BEND, INDIANA, ASSIGNOR TO OLIVER CHILLED PLOW WORKS, OF SOUTH BEND, INDIANA.

PLOW.

1,405,088. Specification of Letters Patent. Patented Jan. 31, 1922.

Application filed June 17, 1920, Serial No. 389,671. Renewed December 15, 1921. Serial No. 522,702.

*To all whom it may concern:*

Be it known that I, RUDOLPH J. ALTGELT, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plow structures, and more particularly a two-wheeled plow having three bases,—one object of the invention being to so construct the frame of a plow having three bases, that an adjustable draft beam may be loosely connected with an intermediate portion of said frame and also adjustable relatively to a cross bar constituting the forward end of said frame, and so that the forward portion of the frame shall be so formed as not to interfere with the lateral sweep of the draft beam when the same is being adjusted from one position to another with relation to the forward cross bar of the frame, with which it is concerned.

With this and other objects in view, the invention consists in certain novel features of construction and combinations of parts as hereinafter set forth and pointed out in the claims.

In the accompanying drawings; Figure 1 is a plan view of a three-base wheeled plow showing an embodiment of my invention; Figure 2 is a side elevation, and Figure 3 is a detail view showing the bracket 20.

1 represents a plow structure connected, through the medium of a draft beam 2 and connecting devices, with a tractor represented at 3.

The frame of the plow structure includes three plow beams 4, 5, 6 having standards 6ᵃ at their rear ends for the accommodation of plow bases 7. The rear portions of the beams are connected by diagonal cross bars 8 and the forward portions of the beams 5 and 6 are bent somewhat toward each other and their forward ends are connected by a cross bar or rail 9, the latter having bent ends 10 bolted to the outer faces of the forward end portions of said beams 5 and 6.

In the drawing is illustarted a wheeled plow structure provided with power lift mechanism indicated at 11 and adjusting devices indicated at 12 and 13, but the same do not constitute parts of my present invention and further reference to them herein, is unnecessary.

The forward end portion of the central plow beam 4 is bent laterally from a point 14 some distance from the forward end of the frame and made to extend in a diagonal direction to the forward end portion of the beam 5 so as to form a diagonal brace 15, the forward end portion of which is bent as at 16 so that it will lie against the inner face of the beam 5 and is bolted to the latter by means of the same bolts which secure one end of the cross bar or rail 9. A separate diagonal brace 15ᵃ extends from the central beam 4 to the forward end portion of the beam 6,—the forward end portion of this brace 15ᵃ being bent as at 17 and lies against the inner face of the beam 6, to which latter it is secured by the same bolts which secure one end of the cross bar or rail 9 thereto. The rear end portion of the brace 15ᵃ is bent as at 18 so as to lie parallel with the beam 4 in rear of the forward brace portion 15 of the same. The upper end of a bracket 20 is disposed between the beam 4 and the rear portion 18 of the brace 15ᵃ and these parts are secured together by bolts 21.

The draft beam 2 is provided at its rear end with a loop 22 which is loosely connected with the depending bracket 20,—the rear end of said draft beam being thus connected with an intermediate portion of the frame. From its connection with the bracket 20, the draft beam extends, first downwardly and forwardly and then forwardly beyond the front cross bar or rail 9 of the plow frame and with its forward end a shackle 23 is connected by a horizontal pivot 23ᵃ, said shackle being connected by a vertical pivot 23ᵇ with a hitch bar 23ᶜ and the latter is connected in any suitable manner with the tractor 3.

A clamp 24 is movably mounted on the front bar or rail 9 of the plow frame and its upper and lower arms are made with openings for the passage of a vertically disposed supporting bar or upright 25 which depends below the frame sufficiently to receive the draft beam 2 in its looped lower end portion. The bar or upright 25 is so located as to engage the inner face of the front cross bar or rail 9 and a set screw 26 passing through the clamp 24 serves to cause the latter to clamp the depending bar or upright 25 to the cross bar or rail 9 and to also secure said clamp to said cross bar or rail.

By loosening the set screw 26, the clamp 24 and supported bar 25 may be moved on the cross bar or rail 9 and the draft beam thus swung laterally, and the depending supporting bar or upright 24 may be moved vertically.

The depending bar or upright 25 when clamped to the forward end of the frame supports the draft beam 2, but it will be seen that with the use of the devices above described which connect said depending bar with the frame, the draft beam may be adjusted laterally and vertically so as to adapt it for connection with tractors of different makes; that it may be so adjusted as to adapt it for connection with the tractor in such manner that the wheel or wheels at one side of the latter may run in the furrow, or so that the wheel or wheels at both sides may run on unplowed land, and that the draft beam may be securely connected with the forward end of the frame in any position to which it may be adjusted.

It will also be seen that with the use of my improvements, the wheeled plow structure will be held, by the tractor, in proper working position and thus obviate necessity for the use of a trailing wheel for supporting the rear part of the structure.

By the construction of the forward part of the plow frame as hereinbefore described, I am enabled to connect the draft beam for a three-base wheeled plow centrally to said frame rearwardly of the forward end of the latter, and permit said beam and its connection with the forward cross bar of the frame, to be shifted laterally, for effecting adjustment, without conflict with or hindrance of any part of the frame.

Having fully described my invention what I claim as new and desire to secure by Letters-Patent, is:—

1. A wheel plow structure comprising three plow beams each carrying a plow base, said beams constituting parts of the frame of the structure, a forward cross bar also constituting a part of said frame, connecting the forward ends of two of said beams, diagonal braces extending from the central beam to the forward portions of the two side beams, a draft beam loosely connected with the central beam rearwardly of the forward cross bar, and means adjustably connecting the draft beam with said forward cross bar.

2. A plow structure comprising three plow beams, plow bases carried by said beams, a forward cross bar connecting the forward ends of the two side beams, the forward end of the central beam being bent laterally and forwardly and constituting an integral diagonal brace secured at its forward end to the forward end of one of the side beams, a separate diagonal brace secured at one of its ends to the other side beam and at its other end to the central beam rearwardly of the first-mentioned diagonal brace, a bracket adjacent to the juncture of said diagonal braces with the central beam, a draft beam loosely connected at its rear end with said bracket, and means adjustably connecting the draft beam with the forward cross bar.

In testimony whereof, I have signed this specification in the presence of two subscribing witnesses.

RUDOLPH J. ALTGELT.

Witnesses:
T. C. CLINTON,
BESSIE M. ARNOLD.